United States Patent
Sneep (10) Patent No.: US 10,014,772 B2
(45) Date of Patent: Jul. 3, 2018

(54) VOLTAGE REGULATOR

(71) Applicant: NXP B.V., Eindhoven (NL)

(72) Inventor: Jacobus Govert Sneep, Bavel (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/227,701

(22) Filed: Aug. 3, 2016

(65) Prior Publication Data

US 2018/0041121 A1  Feb. 8, 2018

(51) Int. Cl.
| | | |
|---|---|---|
| H02M 3/158 | (2006.01) | |
| H02M 1/08 | (2006.01) | |
| H02M 1/00 | (2006.01) | |

(52) U.S. Cl.
CPC ............ *H02M 3/158* (2013.01); *H02M 1/08* (2013.01); *H02M 2001/0009* (2013.01)

(58) Field of Classification Search
CPC . H02M 3/158; H02M 1/08; H02M 2001/0009
See application file for complete search history.

(56) References Cited

U.S. PATENT DOCUMENTS

| | | |
|---|---|---|
| 5,504,452 A | 4/1996 | Takenaka |
| 9,122,293 B2 | 9/2015 | Price et al. |
| 2009/0189577 A1* | 7/2009 | Lin ............ G05F 1/56 323/273 |
| 2013/0222052 A1* | 8/2013 | Gakhar ............ G05F 1/575 327/539 |
| 2015/0198960 A1 | 7/2015 | Zhang et al. |

OTHER PUBLICATIONS

Lüders, M. et al; "Fully-integrated LDO voltage regulator for digital circuits", Advances in Radio Science, 9; pp. 263-267 (2011).
den Besten, Gerrit W. et al; "Embedded 5V-to-3.3V voltage regulator for supplying digital IC's in 3.3V technology"; IEEE J.Solid-State Circuits, vol. 33; No. 7; pp. 956-962 (Jul. 1998).
Hazucha, Peter et al; "An Area-Efficient Linear Regulator with Ultra-Fast Load Regulation"; IEEE Journal of Solid-State Circuits, vol. 40, No. 4; 4 pages (Apr. 2005).
U.S. Appl. No. 15/344,270 not yet published, filed Nov. 4, 2016.
Non Final Office Action; U.S. Appl. No. 15/344,270; 18 pages (May 4, 2017).

* cited by examiner

*Primary Examiner* — Jue Zhang (57) ABSTRACT

One example discloses a voltage regulator, including: a power supply input; a regulated voltage output; an output transistor coupled to the power supply input and the regulated voltage output; and a current amplifier coupled between the power supply input and the regulated voltage output; wherein the current amplifier is configured to supply a second current from the power supply input to the regulated voltage output when a first current between the power supply input and the output transistor exceeds a threshold current.

15 Claims, 7 Drawing Sheets

VOLTAGE REGULATOR

The present specification relates to systems, methods, apparatuses, devices, articles of manufacture and instructions for voltage regulation.

SUMMARY

According to an example embodiment, a voltage regulator, comprising: a power supply input; a regulated voltage output; an output transistor coupled to the power supply input and the regulated voltage output; and a current amplifier coupled between the power supply input and the regulated voltage output; wherein the current amplifier is configured to supply a second current from the power supply input to the regulated voltage output when a first current between the power supply input and the output transistor exceeds a threshold current.

In another example embodiment, the output transistor is an NMOS transistor having a drain coupled to the power supply input and a source coupled to the regulated voltage output.

In another example embodiment, the second current supplied by the current amplifier to the regulated voltage output is a multiple of the first current between the power supply input and the output transistor.

In another example embodiment, the current amplifier includes an amplifier control circuit and an amplified current circuit; the amplifier control circuit, is coupled between the power supply input and the output transistor, and is configured to sense the first current between the power supply input and the output transistor; and the amplified current circuit, is coupled to the amplifier control circuit, and is coupled between the power supply input and the regulated voltage output, and is configured to supply the second current from the power supply input to the regulated voltage output when the first current between the power supply input and the output transistor exceeds the threshold current.

In another example embodiment, the amplifier control circuit and the amplified current circuit are configured as a current mirror, having a current mirror multiple equal to a ratio of the first current and the second current; and the amplified current circuit is configured to supply the second current from the power supply input to the regulated voltage output at the current mirror multiple when the first current between the power supply input and the output transistor exceeds the threshold current.

In another example embodiment, the amplifier control circuit includes a resistor for monitoring the first current between the power supply input and the output transistor.

In another example embodiment, further comprising a differential amplifier configured to compare a voltage reference with a feedback voltage received from the output; and wherein the output transistor is coupled and controlled by the differential amplifier.

In another example embodiment, the voltage regulator is embedded in at least one of: a wall charger, a wireless charger, a mobile phone, or a USB connector, a notebook adapter, a TV adapter, or a PC adapter.

In another example embodiment, the current amplifier is part of an output stage of the voltage regulator.

In another example embodiment, the current amplifier is configured to reduce voltage steps and/or voltage spikes at the regulated voltage output.

In another example embodiment, the current amplifier includes a first NMOS transistor configured to pass the first current and a second NMOS transistor configured to pass the second current; and the first and second NMOS transistors are configured as a current mirror.

In another example embodiment, the current amplifier is a first current amplifier; further comprising a second current amplifier coupled between the first current amplifier and the regulated voltage output; the second current amplifier is configured to supply a third current from the power supply input to the regulated voltage output when the second current between the power supply input and the first current amplifier exceeds a second threshold current.

In another example embodiment, the first current amplifier includes a first NMOS transistor configured to pass the first current and a second NMOS transistor configured to pass the second current; the first and second NMOS transistors are configured as a first current mirror; the second current amplifier includes a first PMOS transistor configured to pass the second current and a second PMOS transistor configured to pass the third current; and the first and second PMOS transistors are configured as a second current mirror.

According to an example embodiment, a voltage regulator, comprising: a power supply input; a regulated voltage output; an output transistor coupled to the power supply input and the regulated voltage output; and means for current amplification coupled between the power supply input and the regulated voltage output; wherein the means for current amplification is configured to supply a second current from the power supply input to the regulated voltage output when a first current between the power supply input and the output transistor exceeds a threshold current.

According to an example embodiment, a method for voltage regulation in a device having a power supply input, a regulated voltage output, and an output transistor coupled to the power supply input and the regulated voltage output, comprising: supplying a second current from the power supply input to the regulated voltage output when a first current between the power supply input and the output transistor exceeds a threshold current.

The above discussion is not intended to represent every example embodiment or every implementation within the scope of the current or future Claim sets. The Figures and Detailed Description that follow also exemplify various example embodiments.

Various example embodiments may be more completely understood in consideration of the following Detailed Description in connection with the accompanying Drawings, in which:

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

DETAILED DESCRIPTION

In order to supply internal circuits operating at different voltage supplies in an integrated circuit voltage regulators are often needed. To reduce the number of pins and external components these voltage regulators should preferably have no external components. Additional demands on these voltage regulators are low-current consumption and frequency stability over a large range of output current and capacitive load. In addition fast reaction to load current variations is required to avoid voltage spikes that might influence the performance of the circuit or cause reliability problems.

Figure 1A:
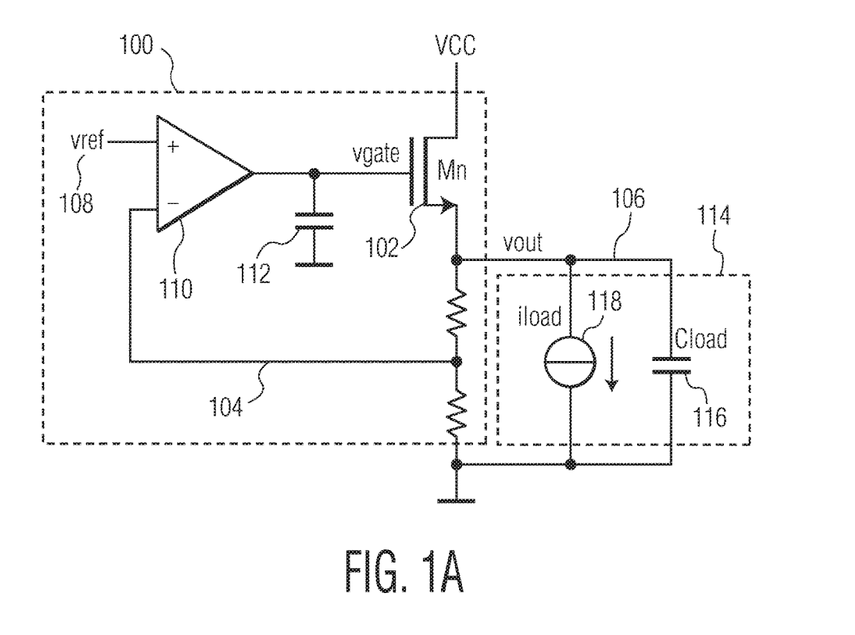
FIG. 1A is a first example of a voltage regulator.

FIG. 1A is a first example 100 of a voltage regulator.

The first example 100 voltage regulator (e.g. an NMOS regulator) is a closed-loop series regulator in which an NMOS device is used as output transistor 102 (i.e. a source follower). Some advantages of this regulator 100 include: simple frequency stabilization, good line regulation and low output impedance.

This example 100 regulator uses a resistive feedback (i.e. voltage divider) 104 to compare a regulated output voltage 106 with a reference voltage 108. A differential amplifier 110 and a compensating capacitor 112 form a low-frequency, dominant pole. The output transistor 102 forms a second pole with a load's 114 output capacitance 116. This second pole is larger than the unity-gain bandwidth defined by the internal gain stage. When the unity-gain bandwidth is small, then there is frequency stability over a wide range of output currents 118 and output capacitors 116.

Fast load current 118 variations in the NMOS voltage regulator 100 however can cause voltage spikes at the voltage output 106 called load steps. If the output (i.e. load) capacitance 116 (Cload) is small in an integrated regulator, the load steps may not be suppressed by the load capacitance 116. The amplitude of the regulated output voltage 106 spike mainly depends on the Ids-Vgs relation of the NMOS output transistor 102. The duration of the voltage 106 spikes depends on the unity gain bandwidth of the regulator 100.

Figure 1B:
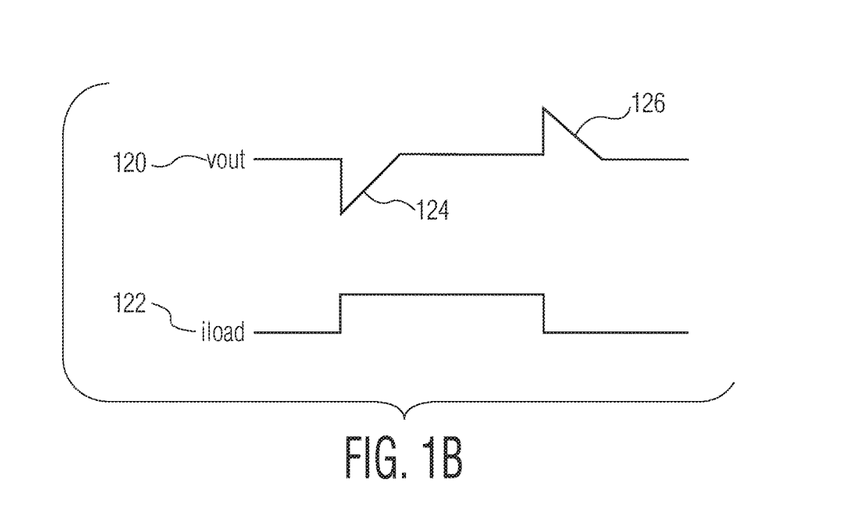
FIG. 1B is an example set of voltage and current waveforms from the first example voltage regulator.

FIG. 1B is an example set of voltage 120 and current 122 waveforms from the first example voltage regulator 100.

Load steps might be either negative 124 or positive 126, 128 dependent on the polarity of the current variation. Negative voltage spikes 124 might cause problems with performance of attached circuits. In case of peripheral digital circuits it may reduce the speed of such circuits. In case of analog circuits, crosstalk due to the voltage spikes 124, 126 or current biasing might be a problem.

Figure 2A:
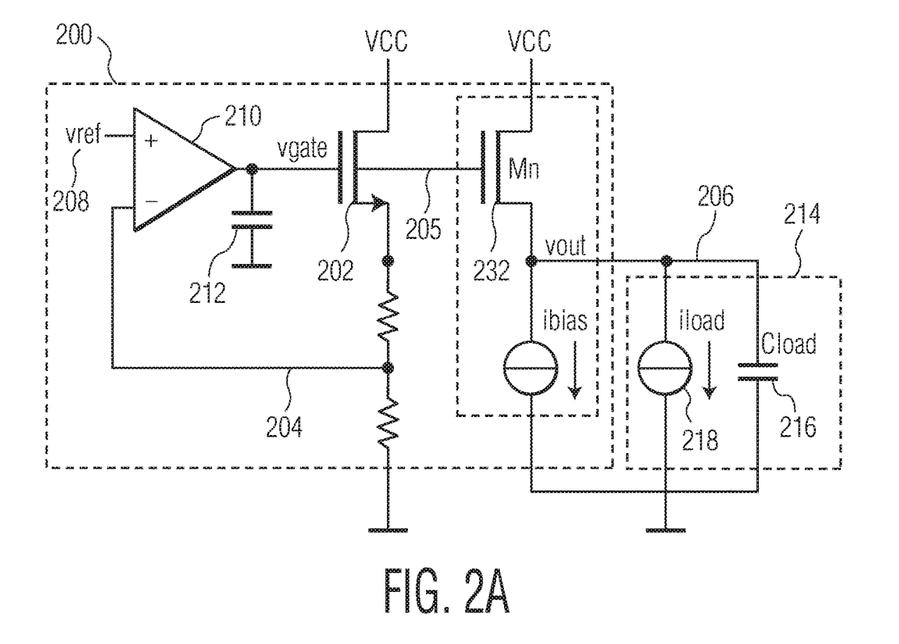
FIG. 2A is a second example of a voltage regulator.
Figure 2B:
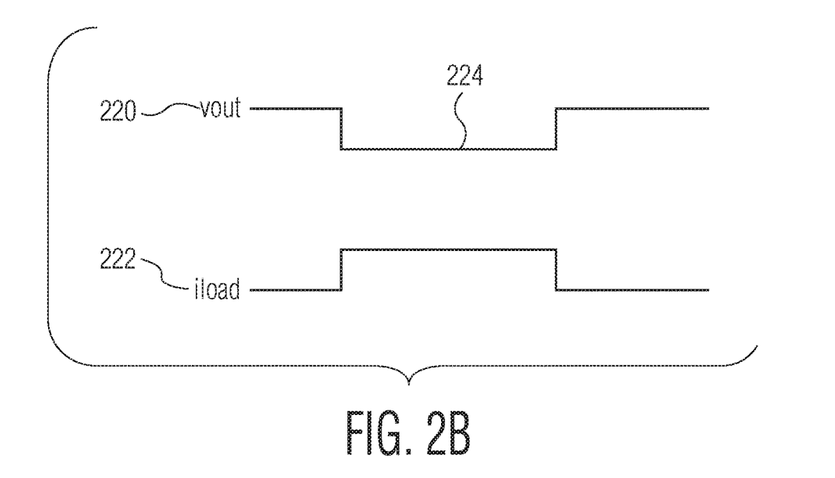
FIG. 2B is an example set of voltage and current waveforms from the second example voltage regulator.

FIG. 2 is a second example 200 of a voltage regulator. The second example 200 voltage regulator (e.g. an NMOS regulator) is also a closed-loop series regulator in which an NMOS device is used as output transistor 232. FIG. 2B is an example set of voltage 220 and current 222 waveforms from the second example voltage regulator 200.

The second voltage regulator 200 includes: an intermediate transistor 202, resistive feedback 204, gate voltage 205, regulated output voltage 206, reference voltage 208, differential amplifier 210, compensating capacitor 212, a replica output regulator 230, and an output transistor 232. The load 214 includes an output capacitance 216 and output current 218.

Positive voltage spikes might be a problem if the maximum voltage rating of attached circuit is violated; however, if the maximum voltage rating is close to a typical voltage level, the replica-output regulator 230 prevents such spikes. The replica output regulator 230 uses the gate voltage 205 in the closed-loop portion of the voltage regulator 200 as an input voltage.

When the gate of the replica output regulator 230 transistor is held at a constant voltage, frequency stability requirements are minimized as are positive voltage spikes (see FIG. 2B) due to load current 222 variations. The regulated output voltage waveform 220 will depend on the output current waveform 222 through the Ids-Vgs relation of the NMOS output transistor 232; however there is still a negative load step 224.

Figure 3:
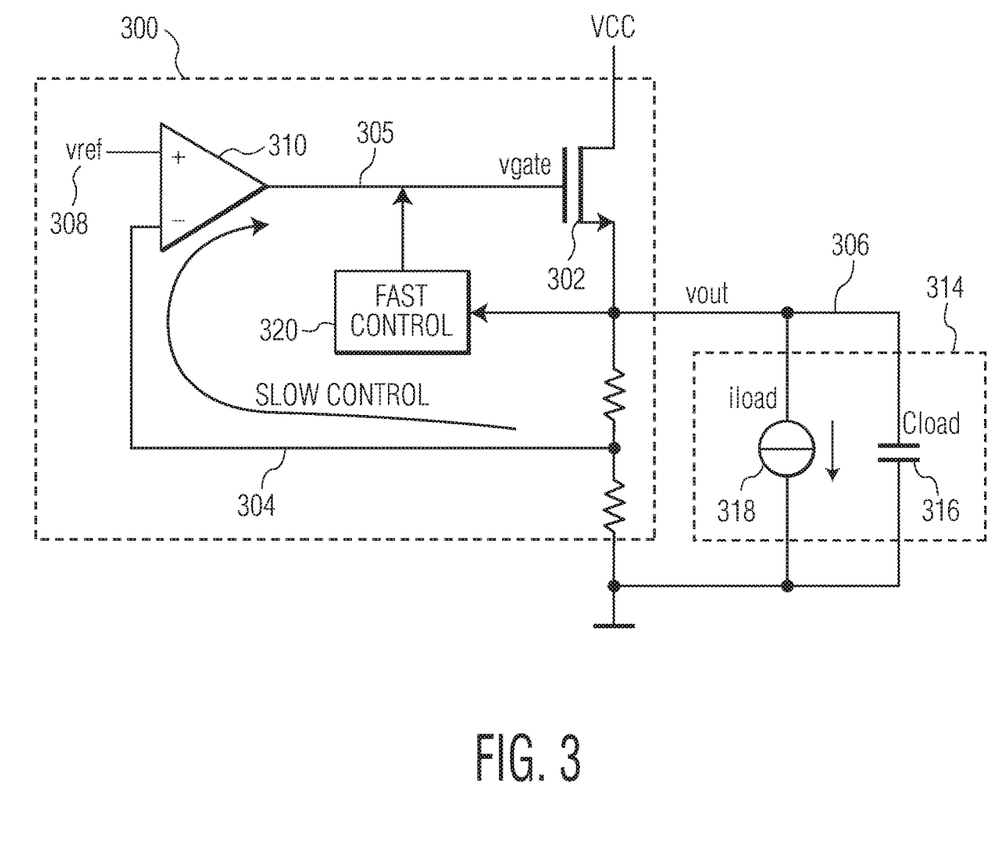
FIG. 3 is a third example of a voltage regulator.

FIG. 3 is a third example 300 of a voltage regulator. The third voltage regulator 300 includes: an output transistor 302, resistive feedback 304, a gate voltage 305, a regulated output voltage 306, a reference voltage 308, a differential amplifier 310, and a fast control circuit 320. The load 314 includes an output capacitance 316 and an output current 318.

The third voltage regulator 300 presents another approach toward overcoming voltage steps due to large load current variations using a fast control circuit 320 which can be either a window comparator or a fast control loop. Both methods control the gate of the NMOS output transistor.

The fast control circuit 320 controls the gate voltage 305 in response to a step in the output current 318. The fast control circuit 320 includes window comparators (not shown) for monitoring the regulated output voltage 306. If the regulated output voltage 306 goes beyond a certain voltage range the gate voltage 305 of the output transistor 302 is controlled by the window comparator such that the regulated output voltage 306 does not go out of a defined regulated voltage range.

In some embodiments however fast comparators are required which may consume a large current. Also there can be a risk of instability due to a high-gain of the window comparator. Implementing window comparators (i.e. the fast control circuit 320) in a replica output voltage regulator may be complicated since the gate voltage 305 is basically fixed.

Figure 4A:
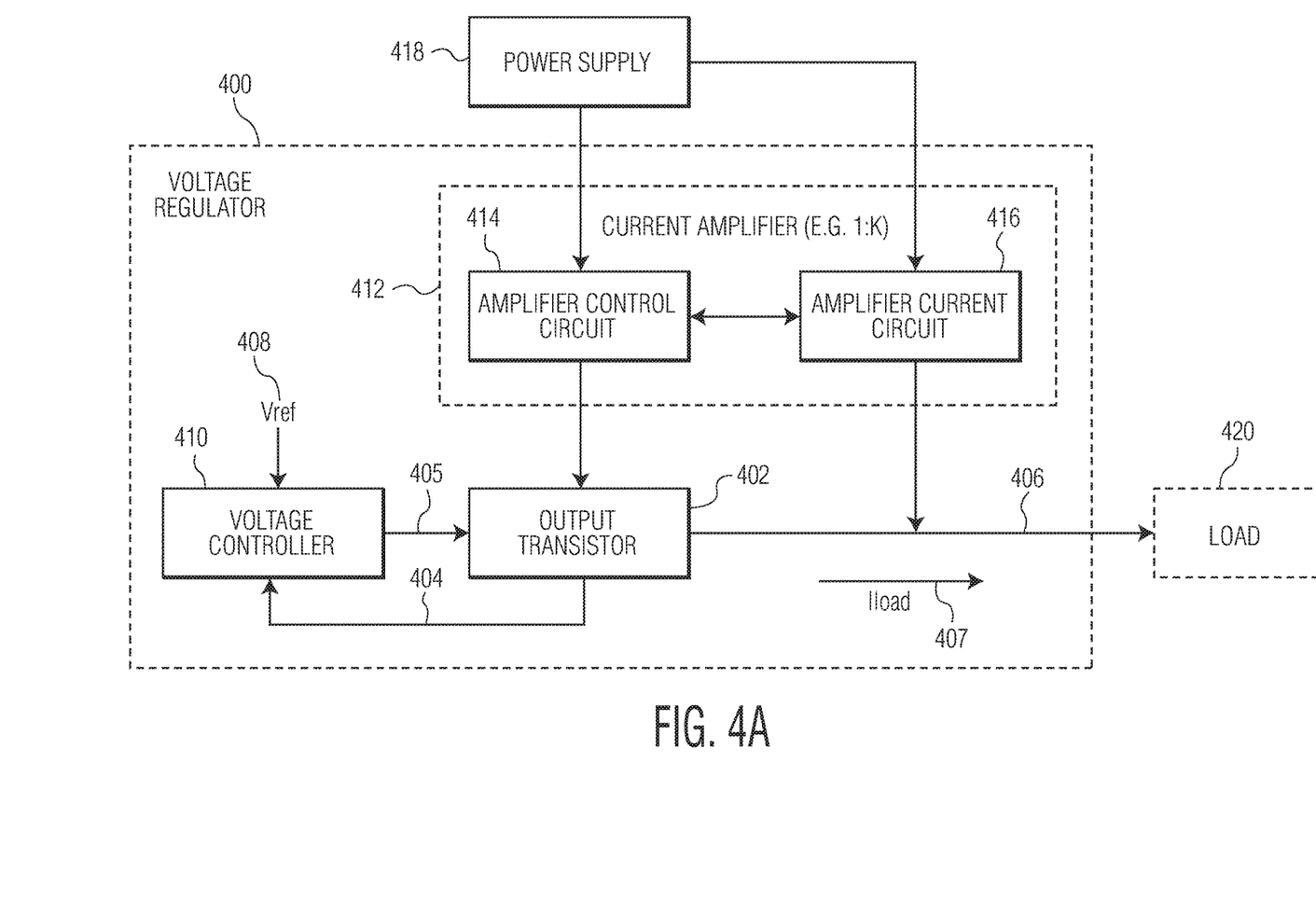
FIG. 4A is a fourth example of a voltage regulator.

FIG. 4A is a fourth example 400 of a voltage regulator. The fourth voltage regulator 400 includes: an output transistor 402 (e.g. an NMOS transistor), a feedback path 404, a gate voltage 405 (i.e. a control voltage), a regulated output voltage 406, a load current 407, a reference voltage 408, a voltage controller 410 (e.g. differential amplifier), and a current amplifier 412. The current amplifier 412 is part of an output stage of the voltage regulator, and includes an amplifier control circuit 414 and an amplified current circuit 416. Connected to the fourth voltage regulator 400 is a power supply 418 and a load 420.

The current amplifier 412 is coupled between a power supply input, which is between the power supply 418 and the voltage regulator 400, and the regulated voltage output which is between the voltage regulator 400 and the load 420.

The current amplifier 412 is configured to supply a second current from the power supply input to the regulated voltage output when a first current between the power supply input and the output transistor 402 exceeds a threshold current.

In the embodiment shown in FIG. 4A the first current is passing through the amplifier control circuit 414 and the second current is passing through the amplified current circuit 416.

The amplifier control circuit 414, between the power supply input and the output transistor, is configured to sense the first current between the power supply input and the output transistor 402.

The amplified current circuit 416 coupled to the amplifier control circuit 414 and between the power supply input and the regulated voltage output, is configured to supply the second current from the power supply input to the regulated voltage output when the first current between the power supply input and the output transistor exceeds the threshold current.

In an example embodiment, the second current supplied by the current amplifier 412 to the regulated voltage output is a multiple of the first current between the power supply input and the output transistor 402.

In an example embodiment the amplifier control circuit 414 and the amplified current circuit 416 are configured as a current mirror, having a current mirror multiple equal to a ratio of the first current and the second current. The amplified current circuit 416 is configured to supply the second current from the power supply input to the regulated voltage output at the current mirror multiple when the first current between the power supply input and the output transistor exceeds the threshold current.

The voltage controller 410 (e.g. differential amplifier) is configured to compare the voltage reference 408 with the feedback voltage 404 received from the output transistor 402. The output transistor 402 is coupled and controlled by the voltage controller 410.

Figure 4B:
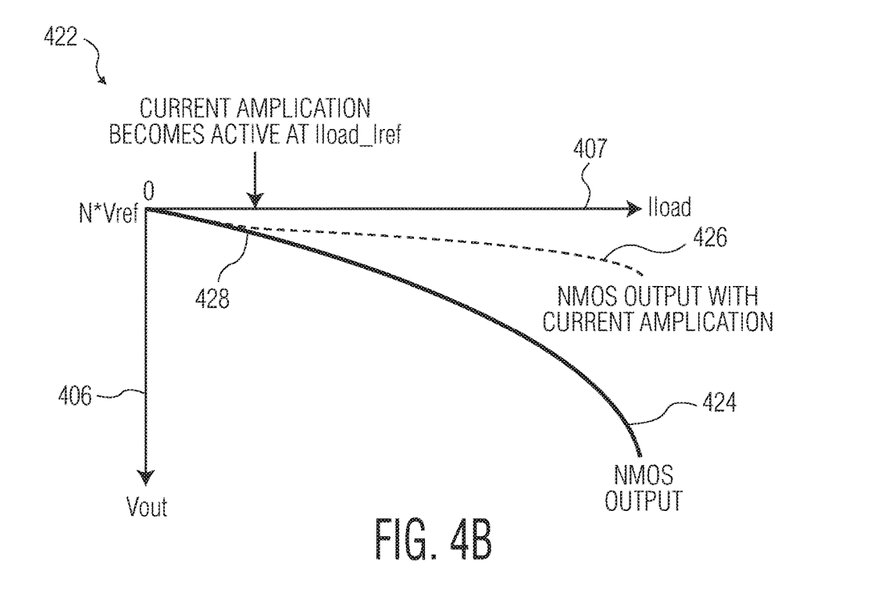
FIG. 4B is an example voltage vs. current waveform from the fourth example voltage regulator.

FIG. 4B is an example regulated output voltage vs. load current graph 422 from the fourth example voltage regulator. Shown in the graph 422: one axis corresponds to the regulated output voltage 406, another axis corresponds to the load current 407.

An I-V (i.e. current-voltage) waveform without current amplification 424 is shown along with an I-V waveform with current amplification 426. A current amplification activation point 428 represents the threshold current where the load current 407 (e.g. Iload) equals the first current between the power supply input and the output transistor 402 (e.g. Iref).

By using current amplification in the output stage, the voltage regulator 400 improves upon load current regulation, as shown in FIG. 4B, thereby reducing voltage steps and/or spikes. The voltage regulator 400 can be used in integrated circuits requiring integrated fast voltage regulators for digital and analog circuits, and can be embedded in: a wall charger, a wireless charger, a mobile phone, or a USB connector.

Thus instead of voltage regulation by controlling the gate voltage 405 of the output transistor 402, the output current is amplified using the current amplifier 412 once the current to the output transistor 402 exceeds the preselected threshold value. Since current mode circuits typically have a high bandwidth, using the voltage regulator 400 the load current 407 control can be very fast, resulting in a fast reaction to load current 407 variations. For replica output voltage regulators the voltage regulator 400 has an advantage that with a constant gate voltage the load step can still be improved.

Figure 5:
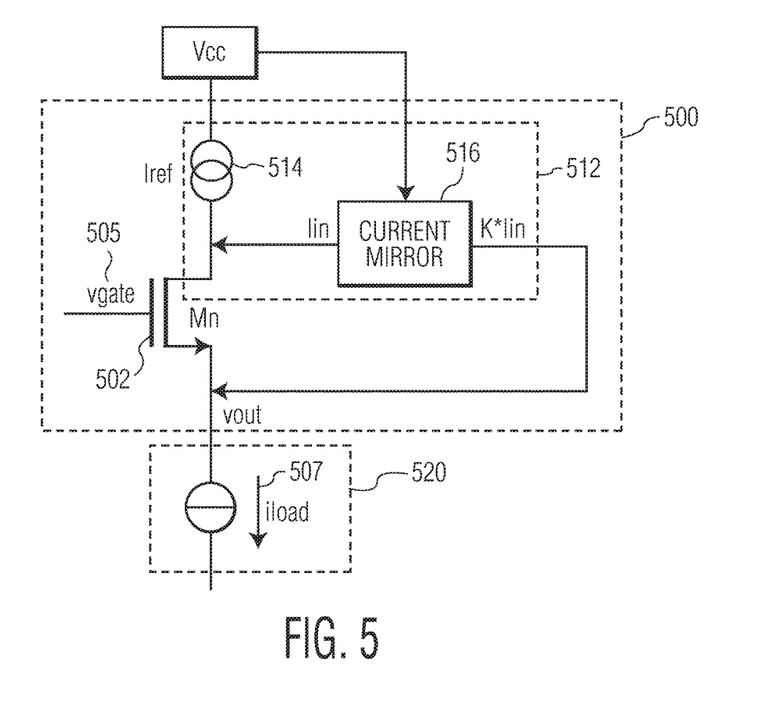
FIG. 5 is a fifth example of a voltage regulator.

FIG. 5 is a fifth example 500 of a voltage regulator. The fifth voltage regulator 500 includes: an output transistor 502, feedback (not shown), a gate voltage 505 (e.g. control voltage), a regulated output voltage 506, a load current 507, a reference voltage (not shown), a voltage controller (not shown), and a current amplifier 512. The current amplifier 512 includes a reference current circuit 514 (e.g. R1) for monitoring a first current (i.e. reference current) (Iref).

The current amplifier 512 also includes a current mirror 516 which multiplies the output transistor 502 drain current by a preselected current multiplication value (i.e. K) once the output transistor's 502 drain current meets and/or exceeds Iref. In this example embodiment, a power supply (not shown) and a load 520 are also connected to the fifth voltage regulator 500.

The fifth voltage regulator 500 otherwise operates in a manner similar to that described in FIGS. 4A and 4B.

Figure 6:
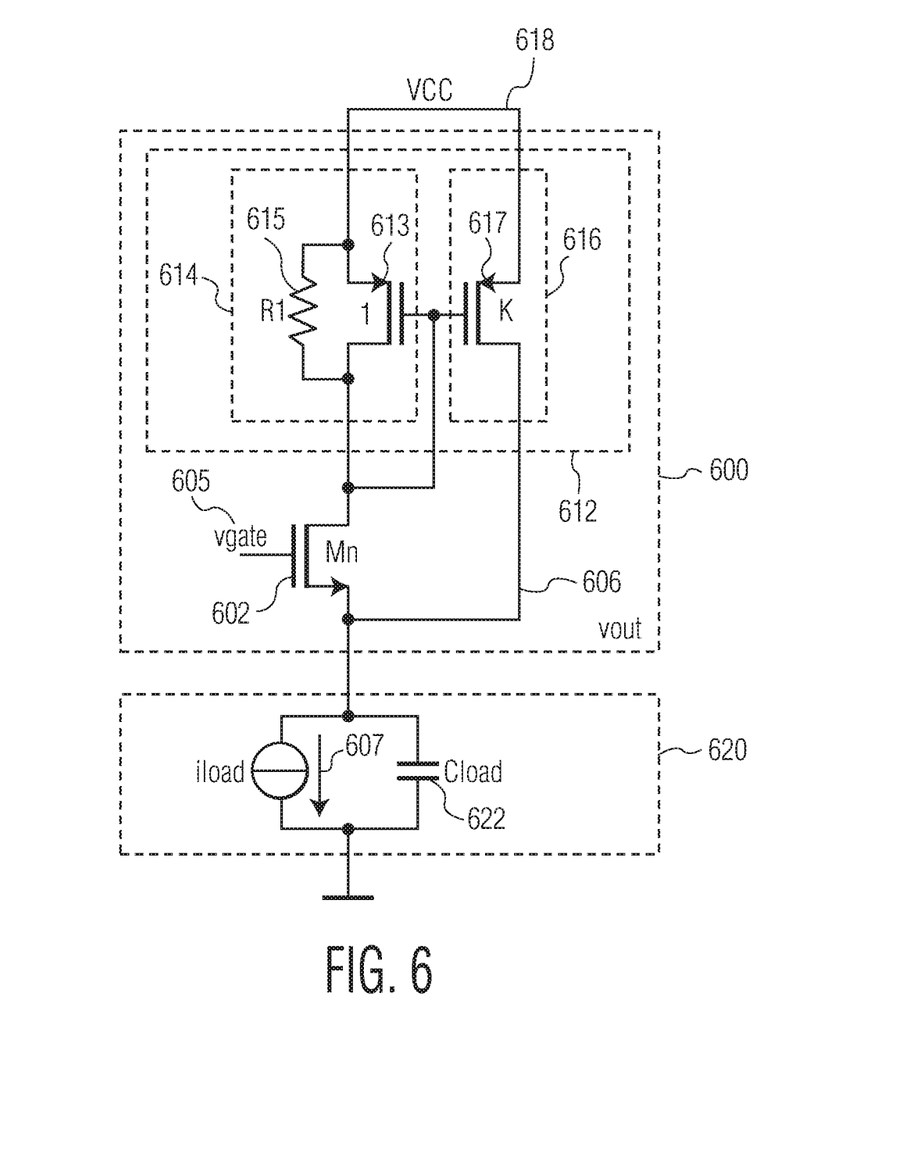
FIG. 6 is a sixth example of a voltage regulator.

FIG. 6 is a sixth example 600 of a voltage regulator. The sixth voltage regulator 600 includes: an output transistor 602 (e.g. Mn), feedback (not shown), a gate voltage 605 (e.g. control voltage), a regulated output voltage 606, a load current 607, a reference voltage (not shown), a voltage controller (not shown), and a current amplifier 612.

The current amplifier 612 includes an amplifier control circuit 614 and an amplified current circuit 616. The amplifier control circuit 614 includes a first NMOS transistor 613 and a resistor 615 (i.e. a bypass resistor for monitoring the first current (i.e. reference current, Iref). The amplified current circuit 616 includes second NMOS transistor 617, wherein the first NMOST 613 and second NMOST 617 are configured as a current mirror.

Connected to the voltage regulator 600 is a power supply 618 and a load 620 having an output capacitance 622.

The resistor 615 (R1) is coupled between the drain and source of the NMOS transistor 613 and defines the threshold current (e.g. Iload=Iref) where current amplification begins (e.g. the current amplification activation point 428).

Resistor R1 also sets a minimum bandwidth of the current mirror. The bandwidth of the current mirror in one example embodiment is larger than the bandwidth of a current loop formed by the output transistor 602 (e.g. Mn) and the current mirror.

When the current through the NMOST 613 is equal to Vt/R1 (e.g. Iload=Iref) the current mirror begins operation and the current is amplified K times (e.g. a 1:K ratio). Vt is the threshold voltage of the NMOST 613. When Vgs (the voltage between the NMOST's 613 gate and source) is smaller than Vt, the NMOST 613 does not conduct.

As discussed with respect to FIGS. 4A and 4B, when Iload=Iref the Iload–Vout waveform is shifted thereby reducing voltage steps at the load 620 as Iload increases. The dominant pole is formed by the output transistor 602 and the load capacitor 622. This embodiment can be as fast as a single transistor yielding a highest possible bandwidth.

Figure 7:
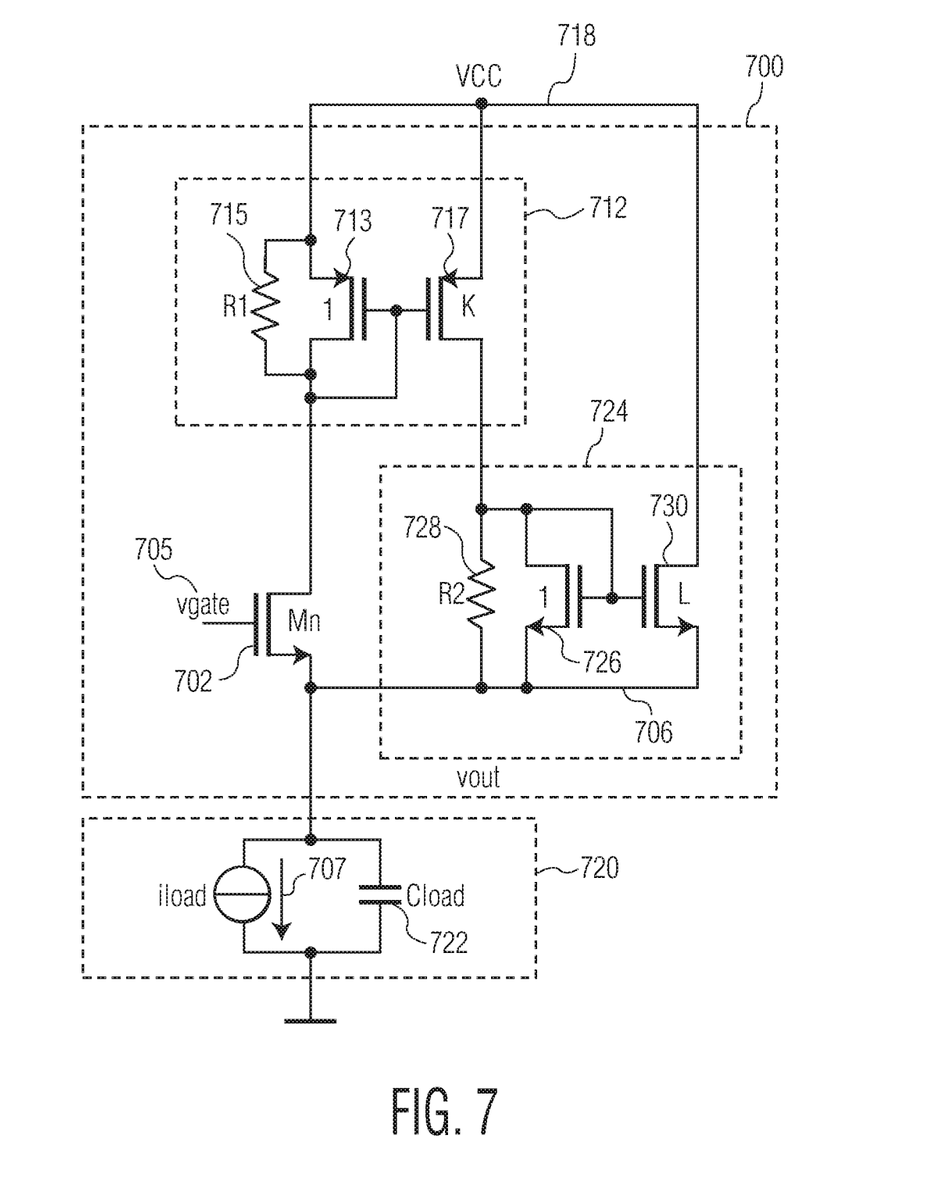
FIG. 7 is a seventh example of a voltage regulator.

FIG. 7 is a seventh example 700 of a voltage regulator. The seventh voltage regulator 700 includes: an output transistor 702 (e.g. Mn), feedback (not shown), a gate voltage 705 (e.g. control voltage), a regulated output voltage 706, a load current 707, a reference voltage (not shown), a voltage controller (not shown), a first current amplifier 712 and a second current amplifier 724.

The first current amplifier 712 includes an amplifier control circuit (not shown) having a first NMOST 713 and a resistor 715 for monitoring a first current (i.e. reference current, Iref). The first current amplifier 712 also includes an amplified current circuit (not shown) having a second NMOST 717, wherein the first MOST 713 and second MOST 717 are configured as a first current mirror.

The second current amplifier 724 includes an amplifier control circuit (not shown) having a first PMOST 726 and a resistor 728 for monitoring a second current through the second NMOST 717. The second current amplifier 724 also includes an amplified current circuit (not shown) having a second PMOST 730 wherein the first PMOST 726 and second PMOST 730 are configured as a second current mirror.

Connected to the voltage regulator 700 is a power supply 718 and a load 720 having an output capacitance 722.

The first current amplifier 712 is configured to supply a second current from the power supply input when a first current between the power supply input and the output transistor 702 exceeds a first threshold current. The second current amplifier 724 is configured to supply a third current from the power supply input to the regulated voltage output 706 when the second current between the power supply input and the first current amplifier 712 exceeds a second threshold current. Together the first and second current amplifiers 712 and 714 further multiply the current sent to the load 720

The seventh example voltage regulator 700 thus includes multiple current amplification stages. These multiple current amplification stages offer higher current amplification gain and bandwidth as compared to the single NMOST current mirror of FIG. 6.

In this specification, example embodiments have been presented in terms of a selected set of details. However, a person of ordinary skill in the art would understand that many other example embodiments may be practiced which include a different selected set of these details. It is intended that the following claims cover all possible example embodiments.

What is claimed is:

1. A voltage regulator, comprising:
a power supply input;
a regulated voltage output;
an output transistor coupled to the power supply input and the regulated voltage output; and
a current amplifier coupled between the power supply input and the regulated voltage output;
wherein the current amplifier is configured to supply a second current from the power supply input to the regulated voltage output when a first current between the power supply input and the output transistor exceeds a threshold current;
wherein the current amplifier includes an amplifier control circuit;
wherein the amplifier control circuit, is coupled to the power supply input and a drain or a source of the output transistor, and is configured to sense the first current between the power supply input and the output transistor;
wherein the current amplifier includes a first NMOS transistor configured to pass the first current and a second NMOS transistor configured to pass the second current; and
wherein the first and second NMOS transistors are configured as a current mirror.

2. The regulator of claim 1:
wherein the output transistor is an NMOS transistor having a drain coupled to the power supply input and a source coupled to the regulated voltage output.

3. The regulator of claim 1:
wherein the second current supplied by the current amplifier to the regulated voltage output is a multiple of the first current between the power supply input and the output transistor.

4. The regulator of claim 1:
wherein the current amplifier includes an amplified current circuit; and
wherein the amplified current circuit, is coupled to the amplifier control circuit, and is coupled between the power supply input and the regulated voltage output, and is configured to supply the second current from the power supply input to the regulated voltage output when the first current between the power supply input and the output transistor exceeds the threshold current.

5. The regulator of claim 4:
wherein the amplifier control circuit and the amplified current circuit are configured as a current mirror, having a current mirror multiple equal to a ratio of the first current and the second current; and
wherein the amplified current circuit is configured to supply the second current from the power supply input to the regulated voltage output at the current mirror multiple when the first current between the power supply input and the output transistor exceeds the threshold current.

6. The regulator of claim 4:
wherein the amplifier control circuit includes a resistor for monitoring the first current between the power supply input and the output transistor.

7. The regulator of claim 1:
further comprising a differential amplifier configured to compare a voltage reference with a feedback voltage received from the output; and
wherein the output transistor is coupled and controlled by the differential amplifier.

8. The regulator of claim 1:
wherein the voltage regulator is embedded in at least one of: a wall charger, a wireless charger, a mobile phone, or a USB connector, a notebook adapter, a TV adapter, or a PC adapter.

9. The regulator of claim 1:
wherein the current amplifier is part of an output stage of the voltage regulator.

10. The regulator of claim 1:
wherein the current amplifier is configured to reduce voltage steps and/or voltage spikes at the regulated voltage output.

11. The regulator of claim 1:
wherein the current amplifier is a first current amplifier;
further comprising a second current amplifier coupled between the first current amplifier and the regulated voltage output; and
wherein the second current amplifier is configured to supply a third current from the power supply input to the regulated voltage output when the second current between the power supply input and the first current amplifier exceeds a second threshold current.

12. The regulator of claim 11:
wherein the first current amplifier includes a first NMOS transistor configured to pass the first current and a second NMOS transistor configured to pass the second current;
wherein the first and second NMOS transistors are configured as a first current mirror;
wherein the second current amplifier includes a first PMOS transistor configured to pass the second current and a second PMOS transistor configured to pass the third current; and
wherein the first and second PMOS transistors are configured as a second current mirror.

13. A voltage regulator, comprising:
a power supply input;
a regulated voltage output;
an output transistor coupled to the power supply input and the regulated voltage output; and
means for current amplification coupled between the power supply input and the regulated voltage output;
wherein the means for current amplification is configured to supply a second current from the power supply input to the regulated voltage output when a first current between the power supply input and the output transistor exceeds a threshold current;
wherein the means for current amplification includes an amplifier control circuit;
wherein the amplifier control circuit, is coupled to the power supply input and a drain or a source of the output transistor, and is configured to sense the first current between the power supply input and the output transistor;
wherein the means for current amplification includes a first NMOS transistor configured to pass the first current and a second NMOS transistor configured to pass the second current; and
wherein the first and second NMOS transistors are configured as a current mirror.

14. A voltage regulator, comprising:
a power supply input;
a regulated voltage output;
an output transistor coupled to the power supply input and the regulated voltage output; and
a current amplifier coupled between the power supply input and the regulated voltage output;
wherein the current amplifier is configured to supply a second current from the power supply input to the regulated voltage output when a first current between the power supply input and the output transistor exceeds a threshold current;
wherein the current amplifier is a first current amplifier;
further comprising a second current amplifier coupled between the first current amplifier and the regulated voltage output; and
wherein the second current amplifier is configured to supply a third current from the power supply input to the regulated voltage output when the second current between the power supply input and the first current amplifier exceeds a second threshold current;
wherein the first current amplifier includes a first NMOS transistor configured to pass the first current and a second NMOS transistor configured to pass the second current;
wherein the first and second NMOS transistors are configured as a first current mirror;
wherein the second current amplifier includes a first PMOS transistor configured to pass the second current and a second PMOS transistor configured to pass the third current; and
wherein the first and second PMOS transistors are configured as a second current mirror.

15. A voltage regulator, comprising:
a power supply input;
a regulated voltage output;
an output transistor coupled to the power supply input and the regulated voltage output; and
a current amplifier coupled between the power supply input and the regulated voltage output;
wherein the current amplifier is configured to supply a second current from the power supply input to the regulated voltage output when a first current between the power supply input and the output transistor exceeds a threshold current;
wherein the current amplifier includes an amplifier control circuit;
wherein the amplifier control circuit, is coupled to the power supply input and a drain or a source of the output transistor, and is configured to sense the first current between the power supply input and the output transistor;
wherein the current amplifier includes an amplified current circuit;
wherein the amplified current circuit, is coupled to the amplifier control circuit, and is coupled between the power supply input and the regulated voltage output, and is configured to supply the second current from the power supply input to the regulated voltage output when the first current between the power supply input and the output transistor exceeds the threshold current;
wherein the amplifier control circuit and the amplified current circuit are configured as a current mirror, having a current mirror multiple equal to a ratio of the first current and the second current; and
wherein the amplified current circuit is configured to supply the second current from the power supply input to the regulated voltage output at the current mirror multiple when the first current between the power supply input and the output transistor exceeds the threshold current.

* * * * *